(12) United States Patent
Shizuka et al.

(10) Patent No.: US 8,354,191 B2
(45) Date of Patent: Jan. 15, 2013

(54) LAYERED LITHIUM NICKEL MANGANESE COBALT COMPOSITE OXIDE POWDER FOR MATERIAL OF POSITIVE ELECTRODE OF LITHIUM SECONDARY BATTERY, PROCESS FOR PRODUCING THE SAME, POSITIVE ELECTRODE OF LITHIUM SECONDARY BATTERY THEREFROM, AND LITHIUM SECONDARY BATTERY

(75) Inventors: Kenji Shizuka, Inashiki-gun (JP); Kenji Okahara, Inashiki-gun (JP)

(73) Assignee: Mitsubishi Chemical Corporation, Tokyo (JP)

(*) Notice: Subject to any disclaimer, the term of this patent is extended or adjusted under 35 U.S.C. 154(b) by 1502 days.

(21) Appl. No.: 10/591,911

(22) PCT Filed: Apr. 27, 2005

(86) PCT No.: PCT/JP2005/008047
§ 371 (c)(1),
(2), (4) Date: Jan. 18, 2007

(87) PCT Pub. No.: WO2005/104274
PCT Pub. Date: Nov. 3, 2005

(65) Prior Publication Data
US 2007/0202405 A1    Aug. 30, 2007

(30) Foreign Application Priority Data
Apr. 27, 2004   (JP) .................. 2004-131599

(51) Int. Cl.
H01M 4/02  (2006.01)
H01M 4/505  (2010.01)
H01M 4/525  (2010.01)

(52) U.S. Cl. .......... 429/218.1; 429/122; 429/223; 429/224

(58) Field of Classification Search .......... None
See application file for complete search history.

(56) References Cited

U.S. PATENT DOCUMENTS

| | | | |
|---|---|---|---|
| 2003/0054218 A1* | 3/2003 | Hampden-Smith et al. | 429/27 |
| 2004/0076882 A1* | 4/2004 | Hosoya et al. | 429/223 |
| 2005/0158546 A1* | 7/2005 | Shizuka | 428/402 |

FOREIGN PATENT DOCUMENTS

| | | |
|---|---|---|
| EP | 0 944 125 A1 | 9/1999 |
| EP | 1 207 575 A2 | 5/2002 |
| JP | 2002 110167 | 4/2002 |
| JP | 2002 367610 | 12/2002 |
| JP | 2003 31219 | 1/2003 |
| JP | 2003 197181 | 7/2003 |
| JP | 2004 111076 | 4/2004 |
| JP | 2005 19206 | 1/2005 |
| JP | 2005 25975 | 1/2005 |
| WO | WO 03/044881 A1 | 5/2003 |

OTHER PUBLICATIONS

U.S. Appl. No. 12/517,813, filed Jun. 5, 2009, Shizuka, et al.
U.S. Appl. No. 11/815,319, filed Aug. 2, 2007, Shizuka, et al.
U.S. Appl. No. 11/979,111, filed Oct. 31, 2007, Shizuka.
U.S. Appl. No. 12/296,212, filed Oct. 6, 2008, Shizuka, et al.
U.S. Appl. No. 12/676,467, filed Mar. 4, 2010, Shizuka, et al.

* cited by examiner

*Primary Examiner* — Barbara Gilliam
*Assistant Examiner* — Kwang Han
(74) *Attorney, Agent, or Firm* — Oblon, Spivak, McClelland, Maier & Neustadt, L.L.P.

(57) ABSTRACT

A powder of a layered lithium-nickel-manganese-cobalt composite oxide for use as a positive-electrode material for lithium secondary battery is provided which, when used as a positive-electrode material for lithium secondary battery, enables a cost reduction and higher safety to be reconciled with improved battery performances.

The powder of a layered lithium-nickel-manganese-cobalt composite oxide for use as a positive-electrode material for lithium secondary battery is composed of secondary particles formed by the aggregation of primary particles. It has a composition represented by the following formula (I), has a volume resistivity of $5 \times 10^5$ Ω·cm or lower in the state of being compacted at a pressure of 40 MPa, and has a value of C/S, wherein C is the concentration of carbon contained therein (% by weight) and S is the BET specific surface area thereof ($m^2/g$), of 0.025 or smaller. The powder has been regulated so as to have a volume resistivity not higher than the specified value and a considerably reduced carbon content while having a composition in a limited range, whereby a cost reduction and higher safety can be reconciled with improved battery performances.

$$Li_{1+z}Ni_xMn_yCo_{1-x-y}O_\delta \quad (I)$$

($0 < z \leq 0.91$, $0.1 \leq x \leq 0.55$, $0.20 \leq y \leq 0.90$, $0.50 \leq x+y \leq 1$, $1.9 \leq \delta \leq 3$).

19 Claims, No Drawings

LAYERED LITHIUM NICKEL MANGANESE COBALT COMPOSITE OXIDE POWDER FOR MATERIAL OF POSITIVE ELECTRODE OF LITHIUM SECONDARY BATTERY, PROCESS FOR PRODUCING THE SAME, POSITIVE ELECTRODE OF LITHIUM SECONDARY BATTERY THEREFROM, AND LITHIUM SECONDARY BATTERY

TECHNICAL FIELD

The present invention relates to a powder of a layered lithium-nickel-manganese-cobalt composite oxide for use as a positive-electrode material for lithium secondary battery, a process for producing the powder, a positive electrode for lithium secondary battery which employs the powder of a layered lithium-nickel-manganese-cobalt composite oxide, and a lithium secondary battery having the positive electrode for lithium secondary battery.

BACKGROUND ART

Lithium secondary batteries are excellent in energy density, output density, etc. and are effective in size and weight reduction. There is hence a rapidly growing demand for these batteries as power sources for portable appliances such as notebook type personal computers, portable telephones, and handy video cameras. Lithium secondary batteries are receiving attention also as power sources for electric cars, power load leveling, etc.

At present, lithium-manganese composite oxides having a spinel structure, layered lithium-nickel composite oxides, and layered lithium-cobalt composite oxides are used as positive-electrode active materials for lithium secondary battery. Lithium secondary batteries employing these lithium composite oxides each has advantages and disadvantages in properties. Namely, the lithium-manganese composite oxides having a spinel structure are inexpensive and relatively easy to synthesize and give batteries having excellent safety, but these batteries have a low capacity, and poor high-temperature characteristics (cycle and storage). The layered lithium-nickel composite oxides have a high capacity, and excellent high-temperature characteristics, but have disadvantages, for example, that they are difficult to synthesize and give batteries which have poor stability and necessitate care in storage. The layered lithium-cobalt composite oxides are easy to synthesize, excellent in battery performance balance, and hence extensively used as power sources for portable appliances but have great disadvantages in that the cells have insufficient safety and a high cost.

Under these circumstances, a lithium-nickel-manganese-cobalt composite oxide having a layered structure was proposed as a promising active material which eliminates or minimizes the disadvantages of those positive-electrode active materials and attains an excellent battery performance balance. In particular, there recently are growing desires for a cost reduction and higher safety, and this composite oxide is thought to be a promising positive-electrode active material capable of satisfying these two desires. It should, however, be noted that the degrees of cost reduction and safety vary depending on composition, in particular Ni/Mn/Co proportion, and it is therefore necessary that a material having a composition in a limited range specified by the present inventors should be selected and used in order to satisfy the desires for a further cost reduction and higher safety.

However, lithium secondary batteries in which a layered lithium-nickel-manganese-cobalt composite oxide having a composition in such a range for a low cost and high safety are reduced in battery performances themselves such as charge/discharge capacity and output characteristics. A further improvement has hence been necessary for improving battery performances for practical use.

Among patent documents in which a battery performance improvement was attempted in a lithium-nickel-manganese-cobalt composite oxide composition region with relatively high safety is JP-A-2002-110. One of the reasons for a battery performance improvement in this patent document may be the selection of a lithium/transition metal (nickel, manganese, and cobalt) proportion. However, there is no statement in this document on volume resistivity, which is a requirement for battery performance improvement in the invention. Furthermore, there is no statement concerning the concentration of the carbon contained, which as an impurity component causes side reactions and is present on the surface of and at grain boundaries in the positive-electrode active material to inhibit lithium ion intercalation/deintercalation reactions and which thereby or otherwise influences the battery performances. The document includes no recognition to influences of volume resistivity and the concentration of carbon contained on battery performances.

In addition, the process for production through coprecipitation described in that document has a drawback that the coprecipitated hydroxide precursor obtained has a small specific surface area and hence shows low reactivity with a lithium compound in the calcination step. Unreacted lithium is hence apt to remain in the form of carbonate. Furthermore, since subsequent mixing with the lithium compound is insufficient, the excess lithium ingredient will remain as a carbonate in parts where the lithium compound localizes. It is therefore extremely difficult to obtain a lithium-nickel-manganese-cobalt composite oxide having the low carbon concentration specified in the invention.

Patent Document 1: JP-A-2002-110167

DISCLOSURE OF THE INVENTION

Problems that the Invention is to Solve

An object of the invention is to provide: a powder of a layered lithium-nickel-manganese-cobalt composite oxide which is for use as a positive-electrode material for lithium secondary battery and which, when used as a positive-electrode material for lithium secondary battery, enables a cost reduction and higher safety to be reconciled with improved battery performances; a process for producing the same; a positive electrode for lithium secondary battery which employs the powder of a layered lithium-nickel-manganese-cobalt composite oxide; and a lithium secondary battery having the positive electrode for lithium secondary battery.

Means for Solving the Problems

The powder of a layered lithium-nickel-manganese-cobalt composite oxide of the invention which is for use as a positive-electrode material for lithium secondary battery is characterized by having a composition represented by the following formula (I), having a volume resistivity of $5 \times 10^5$ Ω·cm or lower in the state of being compacted at a pressure of 40 MPa, and having a value of C/S, wherein C is the concentration of carbon contained therein (% by weight) and S is the BET specific surface area thereof (m²/g), of 0.025 or smaller:

$$Li_{1+z}Ni_xMn_yCo_{1-x-y}O_\delta \qquad (I)$$

(wherein $0 < z \leq 0.91$, $0.1 \leq x \leq 0.55$, $0.20 \leq y \leq 0.90$, $0.50 \leq x+y \leq 1$, and $1.9 \leq \delta \leq 3$).

The powder of a layered lithium-nickel-manganese-cobalt composite oxide of the invention, which is for use as a positive-electrode material for lithium secondary battery, preferably is one having a composition represented by the following formula (II), having a volume resistivity of $5 \times 10^5$ Ω·cm or lower in the state of being compacted at a pressure of 40 MPa, and having a value of C/S, wherein C is the concentration of carbon contained therein (% by weight) and S is the BET specific surface area thereof (m²/g), of 0.025 or smaller:

$$Li_{1+z}Ni_xMn_yCo_{1-x-y}O_2 \quad (II)$$

(wherein $0 < z \leq 0.15$, $0.20 \leq x \leq 0.55$, $0.20 \leq y \leq 0.55$, and $0.50 \leq x+y \leq 1$).

In formula (I) and formula (II), the value of y/x, which indicates Mn/Ni atomic proportion, preferably is $0.95 \leq y/x \leq 2.5$.

Namely, as a result of intensive investigations, the present inventors have found that by regulating a layered lithium-nickel-manganese-cobalt composite oxide having a composition in a limited range so as to have a volume resistivity not higher than a specified value and a considerably reduced carbon content, a powder of a layered lithium-nickel-manganese-cobalt composite oxide can be obtained which, when used as a positive-electrode material for lithium secondary battery, enables a cost reduction and higher safety to be reconciled with improved battery performances. The invention has been thus completed.

Methods for regulating the volume resistivity of the layered lithium-nickel-manganese-cobalt composite oxide to a value not higher than the specified value are not particularly limited. It is, however, thought that the regulation can be attained, for example, by regulating the lithium/transition metal (nickel, manganese, and cobalt) proportion or diminishing resistive ingredients, such as unreacted substances and impurities, which can be present on the surface of or at grain boundaries in the active material, as will be described later. Furthermore, methods for considerably reducing the carbon content of the layered lithium-nickel-manganese-cobalt composite oxide also are not particularly limited. It is, however, thought that the carbon content reduction can be attained, for example, by the selection of raw materials and improving reactivity in calcination by, e.g., regulating the degree of raw-material pulverization, imparting an increased specific surface area to the raw materials, and improving the degree of raw-material mixing, as will be described later.

The powder of a layered lithium-nickel-manganese-cobalt composite oxide of the invention for use as a positive-electrode material for lithium secondary battery preferably is one in which the concentration of carbon contained therein, C, is 0.025% by weight or lower. It preferably has a bulk density of 1.5 g/cc or higher, an average primary-particle diameter B of 0.1-3 μm, and a secondary-particle median diameter A in the range of 3-20 μm. Furthermore, the powder preferably has a BET specific surface area of 0.2-2.5 m²/g.

The process of the invention for producing a powder of a layered lithium-nickel-manganese-cobalt composite oxide for use as a positive-electrode material for lithium secondary battery is a process for producing the powder of a layered lithium-nickel-manganese-cobalt composite oxide of the invention described above which is for use as a positive-electrode material for lithium secondary battery, and is characterized by comprising pulverizing at least one nickel compound, at least one manganese compound, and at least one cobalt compound in a liquid medium to an average particle diameter of 0.3 μm or smaller to prepare a slurry containing the compounds evenly dispersed therein, spray-drying the slurry to obtain a powder composed of secondary particles formed by the aggregation of primary particles, subsequently sufficiently mixing the powder with at least one lithium compound, and calcining the resultant mixture in an oxygenic gas atmosphere.

The positive electrode for lithium secondary battery of the invention is characterized by comprising a current collector having thereon a positive-electrode active-material layer which comprises the powder of a layered lithium-nickel-manganese-cobalt composite oxide of the invention described above, which is for use as a positive-electrode material for lithium secondary battery, and a binder.

The lithium secondary battery of the invention has a negative electrode capable of intercalating/deintercalating lithium, a nonaqueous electrolyte containing a lithium salt, and a positive electrode capable of intercalating/deintercalating lithium, and is characterized in that the positive electrode employed is the positive electrode for lithium secondary battery of the invention described above.

Advantages of the Invention

The powder of a layered lithium-nickel-manganese-cobalt composite oxide of the invention, which is for use as a positive-electrode material for lithium secondary battery, enables a cost reduction and higher safety to be reconciled with battery performances when used as a positive-electrode material for lithium secondary battery. Consequently, a lithium secondary battery which is inexpensive and highly safe and has excellent battery performances can be provided according to the invention.

BEST MODE FOR CARRYING OUT THE INVENTION

Embodiments of the invention will be explained below in detail. However, the following explanations on the constituent elements merely describe embodiments (typical examples) of the invention and the invention should not be construed as being limited to the following unless the invention departs from the spirit thereof.

[Layered Lithium-Nickel-Manganese-Cobalt Composite Oxide]

The powder of a layered lithium-nickel-manganese-cobalt composite oxide of the invention, which is for use as a positive-electrode material for lithium secondary battery, is characterized by having a composition represented by the following formula (I), having a volume resistivity of $5 \times 10^5$ Ω·cm or lower in the state of being compacted at a pressure of 40 MPa, and having a value of C/S, wherein C is the concentration of carbon contained therein (% by weight) and S is the BET specific surface area thereof (m²/g), of 0.025 or smaller:

$$Li_{1+z}Ni_xMn_yCo_{1-x-y}O_\delta \quad (I)$$

(wherein $0 < z \leq 0.91$, $0.1 \leq x \leq 0.55$, $0.20 \leq y \leq 0.90$, $0.50 \leq x+y \leq 1$, and $1.9 \leq \delta \leq 3$).

In formula (I), the value of z is larger than 0, preferably 0.02 or larger, more preferably 0.04 or larger, most preferably 0.05 or larger, and is 0.91 or smaller, preferably 0.75 or smaller, more preferably 0.55 or smaller, even more preferably 0.35 or smaller, most preferably 0.15 or smaller. In case where the value of z is smaller than the lower limit, there is a possibility that an unreacted substance might remain or an unstable crystal structure might be readily yielded, resulting in reduced conductivity. In case where the value of z exceeds the upper limit, displacement at transition metal sites occurs too large an amount and there is a possibility that use of this composite oxide might give a lithium secondary battery having reduced performances such as reduced battery capacity.

The value of x is 0.10 or larger, preferably 0.15 or larger, more preferably 0.20 or larger, and is 0.55 or smaller, preferably 0.50 or smaller, more preferably 0.45 or smaller. In case where the value of x is smaller than the lower limit, there is a possibility that battery capacity might decrease. Values of x exceeding the upper limit are apt to result in reduced safety.

The value of y is 0.20 or larger, preferably 0.25 or larger, more preferably 0.30 or larger, and is 0.90 or smaller, preferably 0.70 or smaller, more preferably 0.55 or smaller. Values of y smaller than the lower limit tend to result in reduced storage stability. Values thereof exceeding the upper limit tend to result in the generation of a different phase and lead to a decrease in battery performance.

The value of x+y is 0.50 or larger, preferably 0.60 or larger, more preferably 0.65 or larger, even more preferably 0.7 or larger, and is 1 or smaller, preferably 0.95 or smaller, more preferably 0.90 or smaller, most preferably 0.85 or smaller. In case where the value of x+y is smaller than the lower limit, there is a possibility that the battery employing this composite oxide might have impaired safety. Smaller values of the upper limit tend to result in improved battery performances and are hence preferred.

The value of δ is generally 1.9 or larger, preferably 1.95 or larger, more preferably 1.97 or larger, even more preferably 1.98 or larger, most preferably 2 or larger, and is generally 3 or smaller, preferably 2.9 or smaller, more preferably 2.7 or smaller, even more preferably 2.5 or smaller, most preferably 2.2 or smaller. Larger values of the lower limit tend to result in a stabilized crystal structure and improved battery performances and are hence preferred. Smaller values of the upper limit tend to result in improved battery performances and are hence preferred.

The composition (Li/Ni/Mn/Co) of the powder of a layered lithium-nickel-manganese-cobalt composite oxide can be determined by ICP-AES. The oxygen amount δ in formula (I) can be determined, for example, based on the electroneutrality principle from a Li/(Ni+Mn+Co) ratio determined by a composition-determining analysis and the average valence of Ni+Mn+Co determined by a chemical analysis (redox titration with Mohr's salt, iodometry, etc.).

The layered lithium-nickel-manganese-cobalt composite oxide of the invention, which is for use as a positive-electrode material for lithium secondary battery, may be characterized by having a composition represented by the following formula (II), having a volume resistivity of $5 \times 10^5$ Ω·cm or lower in the state of being compacted at a pressure of 40 MPa, and having a value of C/S, wherein C is the concentration of carbon contained therein (% by weight) and S is the BET specific surface area thereof (m²/g), of 0.025 or smaller:

$$Li_{1+z}Ni_xMn_yCo_{1-x-y}O_2 \quad (II)$$

(wherein $0<z\leq0.15$, $0.20\leq x\leq0.55$, $0.20\leq y\leq0.55$, and $0.50\leq x+y\leq1$).

In formula (II), the value of z is larger than 0, preferably 0.02 or larger, more preferably 0.04 or larger, most preferably 0.05 or larger, and is 0.15 or smaller, preferably 0.12 or smaller, more preferably 0.10 or smaller, most preferably 0.08 or smaller. In case where the value of z is smaller than the lower limit, there is a possibility that an unreacted substance might remain or an unstable crystal structure might be readily yielded, resulting in reduced conductivity. In case where the value of z exceeds the upper limit, displacement at transition metal sites occurs too large an amount and there is a possibility that use of this composite oxide might give a lithium secondary battery having reduced performances such as reduced battery capacity.

The value of x is 0.20 or larger, preferably 0.25 or larger, more preferably 0.30 or larger, and is 0.55 or smaller, preferably 0.50 or smaller, more preferably 0.45 or smaller. In case where the value of x is smaller than the lower limit, there is a possibility that battery capacity might decrease. Values of x exceeding the upper limit are apt to result in reduced safety.

The value of y is 0.20 or larger, preferably 0.25 or larger, more preferably 0.30 or larger, and is 0.55 or smaller, preferably 0.50 or smaller, more preferably 0.45 or smaller. Values of y smaller than the lower limit tend to result in reduced storage stability. Values thereof exceeding the upper limit tend to result in the generation of a different phase and lead to a decrease in battery performance.

The value of x+y is 0.50 or larger, preferably 0.60 or larger, more preferably 0.65 or larger, even more preferably 0.7 or larger, and is 1 or smaller, preferably 0.95 or smaller, more preferably 0.90 or smaller, most preferably 0.85 or smaller. In case where the value of x+y is smaller than the lower limit, there is a possibility that the cell employing this composite oxide might have impaired safety. Smaller values of the upper limit tend to result in improved battery performances and are hence preferred.

In particular, there is the following tendencies in the composition range represented by formula (II). The closer the Li/(Ni+Mn+Co) molar ratio to the constant ratio of 1, the smaller the value of C/S but the higher the volume resistivity. Conversely, the larger the Li/(Ni+Mn+Co) molar ratio beyond the constant ratio, the larger the value of C/S but the lower the volume resistivity. Intensive investigations were made especially in order to cope with these inconsistent tendencies in the case where the Mn/Ni atomic proportion is 1 or larger and, as a result, the invention has been completed. It is important that the two should be not larger than the respective specified values.

Although the atomic proportion of oxygen in the composition represented by formula (II) is 2 for convenience, it may vary slightly from the constant value.

The layered lithium-nickel-manganese-cobalt composite oxide of the invention may have at least one displacing element M incorporated in the structure thereof. The displacing element is selected from one or more members consisting of Al, Fe, Ti, Mg, Cr, Ga, Cu, Zn, Nb, Zr, Mo, W, and Sn.

In the powder of a layered lithium-nickel-manganese-cobalt composite oxide of the invention, the value of y/x, which indicates the Mn/Ni atomic proportion, is generally 0.95 or larger, preferably 1 or larger, especially from the standpoint of improving safety and storage stability. From the standpoint of battery capacity, the value of y/x is generally 2.5 or smaller, preferably 2.0 or smaller, more preferably 1.5 or smaller, even more preferably 1.3 or smaller, most preferably 1.1 or smaller.

The volume resistivity of the powder of a layered lithium-nickel-manganese-cobalt composite oxide of the invention which is in the state of being compacted at a pressure of 40 MPa is generally $5 \times 10^5$ Ω·cm or lower, preferably $2 \times 10^5$ Ω·cm or lower, more preferably $1 \times 10^5$ Ω·cm or lower, especially preferably $2 \times 10^4$ Ω·cm or lower, most preferably $1 \times 10^4$ Ω·cm or lower. In case where the volume resistivity thereof exceeds the upper limit, there is a possibility that the powder might give a battery reduced in rate characteristics, low-temperature characteristics, etc. The lower limit of the volume resistivity is $5 \times 10^1$ Ω·cm or higher, preferably $1 \times 10^2$ Ω·cm or higher, more preferably $5 \times 10^2$ Ω·cm or higher, most preferably $1 \times 10^3$ Ω·cm or higher. In case where the volume resistivity of the power is lower than the lower limit, there is a possibility that the powder might give a battery reduced in safety, etc.

In the invention, the volume resistivity of the powder of a layered lithium-nickel-manganese-cobalt composite oxide is the volume resistivity of the layered lithium-nickel-manganese-cobalt composite oxide powder in the state of being compacted at a pressure of 40 MPa, as measured under the conditions of a four-probe ring electrode, an electrode spacing of 5.0 mm, an electrode radius of 1.0 mm, a sample radius of 12.5 mm, and an applied-voltage limiter of 90 V. The volume resistivity of a powder under the given pressure can be measured, for example, with a powder resistivity measuring apparatus (e.g., powder resistivity measuring system Loresta GP, manufactured by DIA Instruments Co., Ltd.) using a probe unit for powders.

The value of C/S of the powder of a layered lithium-nickel-manganese-cobalt composite oxide of the invention is 0.025 or smaller, preferably 0.020 or smaller, more preferably 0.017 or smaller, most preferably 0.015 or smaller. In case where the C/S value thereof exceeds the upper limit, there is a possibility that the powder might give a battery showing enhanced expansion due to gas generation and having reduced battery performances.

The term C/S value means the concentration of carbon contained in the powder of a layered lithium-nickel-manganese-cobalt composite oxide per unit specific surface area. Namely, the carbon concentration C in the powder of a layered lithium-nickel-manganese-cobalt composite oxide depends on the specific surface area S of the powder. Because of this, when samples differing in specific surface area are to be properly compared, it is necessary to convert into concentrations per unit specific surface area before the comparison. The value of C/S can be calculated from the carbon content and specific surface area of the layered lithium-nickel-manganese-cobalt composite oxide powder. In the invention, the value of C/S is determined from the values of these properties obtained by the respective measuring methods which will be shown in the Examples given later. Namely, in the invention, the concentration of carbon C contained in a powder of a layered lithium-nickel-manganese-cobalt composite oxide is determined by infrared spectroscopy after calcination in an oxygen stream (high-frequency heating oven) as will be described later. The specific surface area of a powder of a layered lithium-nickel-manganese-cobalt composite oxide is measured with a known apparatus for measuring the BET specific surface areas of powders. Specifically, nitrogen and helium are used as the gas to be adsorbed and a carrier gas, respectively, to conduct a BET one-point measurement by the continuous flow method. First, a powder sample is heated/degassed at a temperature of 150° C. with a mixed gas composed of the gas to be adsorbed and the carrier gas. Subsequently, the sample is cooled to the liquid-nitrogen temperature to cause it to adsorb the mixed gas. This sample is heated to room temperature with water to desorb the nitrogen gas adsorbed. The amount of the nitrogen gas thus desorbed is determined with a thermal conductivity detector. The specific surface area of the sample is calculated from this nitrogen gas amount.

Incidentally, when the concentration of carbon contained in a layered lithium-nickel-manganese-cobalt composite oxide powder determined by the carbon analysis which will be described later is converted on the assumption that the carbon is wholly derived from carbonic acid ions, then the value thus obtained well coincides with the carbonic acid concentration in the layered lithium-nickel-manganese-cobalt composite oxide powder as determined by analysis by ion chromatography. It is therefore thought that the carbon in a powder of a layered lithium-nickel-manganese-cobalt composite oxide is mostly present as carbonic acid. Consequently, the value of C/S can be regarded as indicative of information about the amount of carbonic acid compounds, especially lithium carbonate, deposited per unit specific surface area.

The concentration of carbon C contained in the powder of a layered lithium-nickel-manganese-cobalt composite oxide of the invention, which is for use as a positive-electrode material for lithium secondary battery, is preferably 0.025% by weight or lower. The concentration of carbon contained is more preferably 0.020% by weight or lower, even more preferably 0.015% by weight or lower, most preferably 0.010% by weight or lower. In case where the concentration of carbon C contained exceeds the upper limit, it is difficult to maintain the battery performances according to the invention.

The amount of a gas which generates in a battery obtained using the powder of a layered lithium-nickel-manganese-cobalt composite oxide can be measured in the following manner.

The amount of a gas which generates can be measured, for example, by the following method. A sheet-form lithium secondary battery is fabricated. This battery is immersed in an ethanol bath to measure the volume thereof. Thereafter, the battery is charged at a constant current of 0.5 C at 60° C. At the time when the cell voltage has reached 4.25 V, the charge is shifted to constant-voltage charge to continuously charge the battery for 1 week. This battery is cooled and then immersed in an ethanol bath to measure the volume thereof. The amount of a gas which has generated is determined from the volume change through the continuous charge.

The powder of a layered lithium-nickel-manganese-cobalt composite oxide of the invention, which is for use as a positive-electrode material for lithium secondary battery, preferably has a bulk density of 1.5 g/cc or higher, an average primary-particle diameter B of 0.1-3 µm, and a secondary-particle median diameter A of 3-20 µm.

The layered lithium-nickel-manganese-cobalt composite oxide of the invention preferably is a powder composed of solid secondary particles formed by the aggregation of primary particles. This form is effective in improving both of powder properties and battery performances. For obtaining this form, it is preferred to produce the powder by the spray drying method. However, production processes should not be limited thereto. Examples of techniques for ascertaining the characteristic form include examination with an SEM and section examination with an SEM.

The average primary-particle diameter of the layered lithium-nickel-manganese-cobalt composite oxide of the invention is generally 0.1 µm or larger, preferably 0.2 µm or larger, more preferably 0.3 µm or larger, most preferably 0.4 µm or larger, and is generally 3 µm or smaller, preferably 2 µm or smaller, more preferably 1 µm or smaller, most preferably 0.6 µm or smaller. Average primary-particle diameters exceeding the upper limit are undesirable because spherical secondary particles are difficult to form and this leads to adverse influences on powder packing and a considerably reduced specific surface area. There is hence a high possibility that battery performances such as rate characteristics and output characteristics might decrease. Average primary-particle diameters smaller than the lower limit are undesirable because crystal growth is insufficient and this may pose a problem, for example, that the reversibility of charge/discharge becomes poor.

The secondary-particle median diameter A of the layered lithium-nickel-manganese-cobalt composite oxide of the invention is generally 3 µm or larger, preferably 5 µm or larger, more preferably 9 μm or larger, most preferably 10 μm or larger, and is generally 20 μm or smaller, preferably 18 μm or smaller, more preferably 16 μm or smaller, most preferably 15 μm or smaller. Secondary-particle median diameters thereof smaller than the lower limit are undesirable because there is a possibility that a product having a high bulk density might not be obtained. Secondary-particle median diameters thereof exceeding the upper limit are undesirable because there is a possibility that battery performances might be reduced or a problem might arise concerning applicability in forming a positive-electrode active-material layer.

The secondary particles of the layered lithium-nickel-manganese-cobalt composite oxide of the invention have a 90% diameter in cumulative distribution ($D_{90}$) which is generally 30 μm or smaller, preferably 26 μm or smaller, more preferably 23 μm or smaller, most preferably 20 μm or smaller, and is generally 5 μm or larger, preferably 8 μm or larger, more preferably 12 μm or larger, most preferably 15 μm or larger. Values of $D_{90}$ exceeding the upper limit are undesirable because there is a possibility that battery performances might be reduced or a problem might arise concerning applicability in forming a positive-electrode active-material layer. Values of $D_{90}$ lower than the lower limit are undesirable because there is a possibility that a product having a high bulk density might not be obtained. The value of 90% diameter in cumulative distribution ($D_{90}$) herein means a value determined with the refractive index set at 1.24.

The bulk density of the powder of a layered lithium-nickel-manganese-cobalt composite oxide of the invention is generally 1.5 g/cc or higher, preferably 1.7 g/cc or higher, more preferably 1.9 g/cc or higher, most preferably 2.1 g/cc or higher. Bulk densities thereof lower than the lower limit are undesirable because powder packing and electrode preparation are adversely influenced and the positive electrode employing this powder as an active material has too low a capacity density per unit volume. The upper limit of the bulk density thereof is generally 3 g/cc or lower, preferably 2.8 g/cc or lower, more preferably 2.6 g/cc or lower. Bulk densities thereof higher than the upper limit are undesirable because the specific surface area of the powder may be too small and this might reduce battery performances, although such high bulk densities are preferred for powder packing and electrode density improvement.

In the invention, the average primary-particle diameter of the powder of a layered lithium-nickel-manganese-cobalt composite oxide is one determined from an SEM image obtained through an examination at a magnification of 30,000 diameters. The secondary-particle median diameter A thereof is one determined from volume-based particle diameters measured with a known laser diffraction/scattering particle size distribution analyzer with the refractive index set at 1.24. In the invention, a 0.1% by weight aqueous solution of sodium hexametaphosphate was used as a dispersion medium in the measurement and the measurement was made after a 5-minute ultrasonic dispersion treatment. The bulk density is determined by placing 5-10 g of the powder of a layered lithium-nickel-manganese-cobalt composite oxide in a 10-mL measuring cylinder made of glass, tapping this cylinder 200 times over a stroke of about 20 mm, and then measuring the density of the powder thus packed (tap density).

The layered lithium-nickel-manganese-cobalt composite oxide of the invention further has a BET specific surface area of 0.2 $m^2$/g or larger, preferably 0.3 $m^2$/g or larger, more preferably 0.4 $m^2$/g or larger, and is 2.5 $m^2$/g or smaller, preferably 1.5 $m^2$/g or smaller, more preferably 1.2 $m^2$/g or smaller, even more preferably 0.9 $m^2$/g or smaller, most preferably 0.6 $m^2$/g or smaller. In case where the BET specific surface area thereof is too small beyond that range, battery performances are apt to decrease. In case where the BET specific surface area thereof is too large beyond that range, it is difficult to obtain an increased bulk density and a problem is apt to arise concerning applicability in forming a positive-electrode active-material layer.

[Process for Producing Layered Lithium-Nickel-Manganese-Cobalt Composite Oxide]

The layered lithium-nickel-manganese-cobalt composite oxide of the invention can be produced, for example, by dispersing a nickel compound, a manganese compound, and a cobalt compound in a liquid medium to prepare a slurry, spray-drying the slurry, mixing the resultant powder with a lithium compound, and calcining the mixture.

For reducing the volume resistivity and C/S value of a layered lithium-nickel-manganese-cobalt composite oxide to obtain the powder of a layered lithium-nickel-manganese-cobalt composite oxide of the invention, it is important to employ some measures. It is not easy to obtain a powder having properties within the specified ranges, as long as proper raw materials are not used or a preferred production process is not applied. For example, it is thought to be important that the degree of pulverization of transition metal compounds as raw materials and other factors should be regulated according to the production process of the invention after the Li/(Ni+Mn+Co) molar ratio is regulated in the specific transition metal composition range in the invention as described above.

The process of the invention for producing the powder of a layered lithium-nickel-manganese-cobalt composite oxide will be explained below in detail.

Examples of the nickel compound, among the raw-material compounds to be used for slurry preparation in producing the layered lithium-nickel-manganese-cobalt composite oxide by the process of the invention, include $Ni(OH)_2$, NiO, NiOOH, $NiCO_3.2Ni(OH)_2.4H_2O$, $NiC_2O_4.2H_2O$, $Ni(NO_3)_2.6H_2O$, $NiSO_4$, $NiSO_4.6H_2O$, fatty acid nickel salts, and nickel halides. Preferred of these from the standpoint of generating no harmful substances such as $NO_x$ and $SO_x$ during a calcination treatment are nickel compounds containing neither a nitrogen atom nor a sulfur atom, such as $Ni(OH)_2$, NiO, NiOOH, $NiCO_3.2Ni(OH)_2.4H_2O$, and $NiC_2O_4.2H_2O$. $Ni(OH)_2$, NiO, and NiOOH are especially preferred from the standpoints of being inexpensively available as industrial raw materials and having high reactivity. Those nickel compounds may be used alone or in combination of two or more thereof.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, dicarboxylic acid manganese salts, manganese citrate, and fatty acid manganese salts, the oxyhydroxide, and halides such as manganese chloride. $MnO_2$, $Mn_2O_3$, and $Mn_3O_4$ are preferred of these manganese compounds because they do not generate gases such as $NO_x$, $SO_x$, and $CO_2$ during a calcination treatment and are inexpensively available as industrial raw materials. Those manganese compounds may be used alone or in combination of two or more thereof.

Examples of the cobalt compound include $Co(OH)_2$, CoOOH, CoO, $Co_2O_3$, $Co_3O_4$, $Co(OCOCH_3)_2.4H_2O$, $CoCl_2$, $Co(NO_3)_2.6H_2O$, and $Co(SO_4)_2.7H_2O$. Preferred of these from the standpoint of generating no harmful substances such as $NO_x$ and $SO_x$ during a calcination treatment are $Co(OH)_2$, CoOOH, CoO, $Co_2O_3$, and $Co_3O_4$. $Co(OH)_2$ and CoOOH are more preferred from the standpoints of being inexpensively available industrially and having high reactivity. Those cobalt compounds may be used alone or in combination of two or more thereof.

Methods for mixing the raw materials are not particularly limited, and the raw materials may be mixed by a wet process or a dry process. Examples thereof include methods using apparatus such as a ball mill, oscillating mill, bead mill, etc. Wet mixing is preferred because more even mixing is possible and the mixture obtained can have enhanced reactivity in a calcination step.

Mixing time varies depending on methods of mixing. However, any mixing time may be used as long as the raw materials are evenly mixed together on a particulate level. For example, the mixing time in mixing with a ball mill (wet or dry mixing) is generally about from 1 hour to 2 days, while the residence time in mixing with a bead mill (wet continuous process) is generally about from 0.1 hour to 6 hours.

It is preferred that in the stage of raw-material mixing, the raw materials be pulverized simultaneously with the mixing.

It is thought that the degree of raw-material pulverization plays an important role in the invention. Namely, the degree of pulverization of the transition metal compounds as raw materials is thought to be an important factor which influences, in particular, the value of C/S specified in the invention. In case where the degree of pulverization is low and the raw-material particles pulverized have a large particle diameter, these raw materials later show reduced reactivity with a lithium source and, hence, unreacted lithium remains in an increased proportion. As a result, the residual lithium is apt to undergo carbonation during or after calcination and to remain as a carbonate, resulting in an increased value of C/S. On the other hand, in the case where the degree of pulverization is high and the raw-material particles have a small particle diameter, these raw materials later show improved reactivity with a lithium source and, hence, unreacted lithium remains in a reduced proportion. As a result, lithium carbonation is less apt to occur during or after calcination and lithium is less apt to remain as a carbonate, whereby a small value of C/S can be obtained.

The degree of pulverization can be expressed in terms of the particle diameter of the raw-material particles after the pulverization. The degree of pulverization in terms of average particle diameter (median diameter) is generally 0.3 µm or smaller, preferably 0.25 µm or smaller, more preferably 0.2 µm or smaller, most preferably 0.15 µm or smaller. In case where the average particle diameter of the raw-material particles which have been pulverized is too large, the raw materials show reduced reactivity in a calcination step and this not only makes it difficult to obtain a value of C/S within the specified range but also results in difficulties in attaining evenness in composition. However, since unnecessarily reducing the particle size leads to an increase in pulverization cost, pulverization to an average particle diameter of generally 0.01 µm or larger, preferably 0.02 µm or larger, more preferably 0.05 µm or larger suffices. Although techniques for realizing such a degree of pulverization are not particularly limited, a wet pulverization technique is preferred. Examples thereof include ones using Dyno Mill. Incidentally, that median diameter of the pulverized particles in each of the slurries which is shown in the Examples of the invention is one determined from volume-based particle diameters measured with a known laser diffraction/scattering particle size distribution analyzer with the refractive index set at 1.24. In the invention, a 0.1% by weight aqueous solution of sodium hexametaphosphate was used as a dispersion medium in the measurement and the measurement was made after a 5-minute ultrasonic dispersion treatment.

After the wet pulverization, the particles are usually subjected to a drying step. Methods for drying are not particularly limited. However, spray drying is preferred from the standpoints of the evenness, powder flowability, and powder handleability of the particulate material to be yielded and the ability to efficiently form spherical secondary particles.

The raw materials are wet-pulverized to an average particle diameter of 0.3 µm or smaller and then spray-dried, whereby a powder composed of solid secondary particles formed by the aggregation of primary particles can be obtained. The powder composed of solid secondary particles formed by the aggregation of primary particles is a shape feature of the product of the invention. This shape feature is basically reflected in the powder of a layered lithium-nickel-manganese-cobalt composite oxide to be obtained by mixing that powder with a lithium source and calcining the mixture, although the particle size changes. Examples of methods for ascertaining the shape include examination with an SEM and section examination with an SEM.

The spray drying is conducted in such a manner that the particulate material to be obtained has an average particle diameter of generally 50 µm or smaller, more preferably 40 µm or smaller, most preferably 30 µm or smaller. However, since too small a particle diameter tends to be difficult to obtain, the average particle diameter thereof is generally 3 µm or larger, preferably 5 µm or larger, more preferably 6 µm or larger. In the case where a particulate material is to be produced through spray drying, the particle diameter thereof can be regulated by suitably selecting a spray mode, pressurized-gas-stream feed rate, slurry feed rate, drying temperature, etc. Incidentally, those median diameters of the particulate powders obtained through spray drying which are shown in the Examples of the invention each are one determined from volume-based particle diameters measured with a known laser diffraction/scattering particle size distribution analyzer with the refractive index set at 1.24. In the invention, a 0.1% by weight aqueous solution of sodium hexametaphosphate was used as a dispersion medium in the measurement and the measurement was made after a 5-minute ultrasonic dispersion treatment.

The particulate material to be obtained through spray drying preferably is one whose specific surface area has been increased as much as possible by, e.g., pulverizing the starting materials before spray drying as described above. This is because the particulate material having a small specific surface area shows reduced reactivity in the subsequent step of calcination and reaction with a lithium compound in producing a layered lithium-nickel-manganese-cobalt composite oxide. On the other hand, excessively increasing the specific surface area is industrially disadvantageous.

Consequently, the particles thus obtained through spray drying have a BET specific surface area of generally 20 $m^2/g$ or larger, preferably 30 $m^2/g$ or larger, more preferably 40 $m^2/g$ or larger, even more preferably 50 $m^2/g$ or larger, most preferably 60 $m^2/g$ or larger, and is generally 200 $m^2/g$ or smaller, preferably 150 $m^2/g$ or smaller.

Examples of the lithium compound to be mixed with the particles obtained by the spray drying include $Li_2CO_3$, $LiNO_3$, $LiNO_2$, LiOH, $LiOH \cdot H_2O$, LiH, LiF, LiCl, LiBr, LiI, $CH_3OOLi$, $Li_2O$, $Li_2SO_4$, dicarboxylic acid lithium salts, lithium citrate, fatty acid lithium salts, and alkyllithiums. Preferred of these lithium compounds from the standpoint of generating no harmful substances such as $NO_x$ and $SO_x$ during a calcination treatment are the lithium compounds containing neither a nitrogen atom nor a sulfur atom. From the standpoint of minimizing the concentration of carbon contained after a calcination treatment, preferred of those lithium compounds are those containing no carbon atom. Especially preferred from these standpoints are LiOH and LiOH.H$_2$O. Those lithium compounds may be used alone or in combination of two or more thereof.

Such a lithium compound has a particle diameter of generally 500 μm or smaller, preferably 100 μm or smaller, more preferably 50 μm or smaller, even more preferably 20 μm or smaller, most preferably 10 μm or smaller, in terms of average particle diameter so as to have enhanced mixability with the mixture comprising a nickel source, manganese source, and cobalt source and to improve battery performances. On the other hand, lithium compounds having too small a particle diameter have low stability in the air. Consequently, the average particle diameter of the lithium compound to be used is generally 0.01 μm or larger, preferably 0.1 μm or larger, more preferably 0.2 μm or larger, most preferably 0.5 μm or larger. Incidentally, the median diameter as the average particle diameter of the lithium hydroxide used as a raw material in the Examples which will be given later is one determined from volume-based particle diameters measured with a known laser diffraction/scattering particle size distribution analyzer with the refractive index set at 1.14. In the invention, ethyl alcohol was used as a dispersion medium in the measurement and the measurement was made after preparation of a saturated lithium hydroxide solution and a subsequent 5-minute ultrasonic dispersion treatment.

In the case where specific production conditions are fixed, the Li/(Ni+Mn+Co) molar ratio can be controlled by regulating the feed amount of the lithium compound relative to the transition metals in mixing the lithium compound with the particles obtained by the spray drying.

It is important that the mixing of the powder obtained by the spray drying with the lithium compound should be sufficiently conducted. As long as sufficient mixing is attained, methods for this mixing are not particularly limited. It is, however, preferred to employ a powder mixer in general industrial use. The atmosphere in which the raw materials are mixed preferably is an inert gas atmosphere such as nitrogen gas or argon gas so as to prevent carbonic acid absorption in the air.

The powder mixture thus obtained is then subjected to a calcination treatment. Conditions for this calcination depend also on the composition and the lithium-compound raw material used. However, there is a tendency that too high calcination temperatures result in excessive growth of primary particles, while too low calcination temperatures result in too low a bulk density and too large a specific surface area. The calcination temperature is generally 800° C. or higher, preferably 900° C. or higher, more preferably 950° C. or higher, and is generally 1,100° C. or lower, preferably 1,075° C. or lower, more preferably 1,050° C. or lower.

For the calcination can be used, for example, a box furnace, tubular furnace, tunnel furnace, rotary kiln, or the like. The calcination step is generally divided into three steps, i.e., heating, maximum-temperature holding, and cooling. The second step of maximum-temperature holding is not always a single-stage step, and may be conducted in two or more stages according to purposes. The steps of heating, maximum-temperature holding, and cooling may be repeatedly conducted two or more times together with a disaggregation step, which means the step of disaggregating to such a degree as not to break the secondary particles, or a pulverization step, which means the step of pulverizing to primary particles or to finer particles, the disaggregation or pulverization step being conducted between sets of the three steps.

In the heating step, the temperature in the furnace is elevated at a heating rate of generally from 1° C./min to 10° C./min. Too low heating rates are industrially disadvantageous because much time is necessary. In some furnaces, too high heating rates make it impossible to adjust the temperature therein to a set temperature.

The holding time in the maximum-temperature holding step varies depending on temperature. However, when the temperature is within the range shown above, the holding time is generally 30 minutes or longer, preferably 5 hours or longer, more preferably 10 hours or longer, and is 50 hours or shorter, preferably 25 hours or shorter, more preferably 20 hours or shorter. Too short calcination times make it difficult to obtain a powder of a layered lithium-nickel-manganese-cobalt composite oxide having satisfactory crystallinity, while too long calcination times are impractical. Too long calcination times are disadvantageous because disaggregation is necessary after the calcination and the disaggregation may be difficult.

In the cooling step, the temperature in the furnace is lowered at a cooling rate of generally from 0.1° C./min to 10° C./min. Too low cooling rates are industrially disadvantageous because much time is necessary, while too high cooling rates tend to result in poor homogeneity of the target product or accelerated deterioration of the vessel.

As the atmosphere for the calcination can be used an oxygenic gas atmosphere such as, e.g., air. In general, an atmosphere whose oxygen concentration is 1% by volume or higher, preferably 10% by volume or higher, and is 100% by volume or lower, preferably 50% by volume or lower, is used.

According to the layered lithium-nickel-manganese-cobalt composite oxide thus obtained, a positive-electrode material for lithium secondary battery having a high capacity, excellent rate characteristics, and excellent low-temperature output characteristics and further having a satisfactory performance balance is provided.

[Positive Electrode for Lithium Secondary Battery]

The positive electrode for lithium secondary battery of the invention is one obtained by forming on a current collector a positive-electrode active-material layer which comprises the powder of a layered lithium-nickel-manganese-cobalt composite oxide of the invention for use as a positive-electrode material for lithium secondary battery and a binder.

The positive-electrode active-material layer is generally formed by dry-mixing the positive-electrode material with a binder optionally further with a conductive material, thickener, etc., forming the mixture into a sheet, and press-bonding the sheet to a positive-electrode current collector. Alternatively, those materials are dissolved or dispersed in a liquid medium to prepare a slurry and this slurry is applied to a positive-electrode current collector and dried to thereby form the active-material layer.

As the material of the positive-electrode current collector is generally used a metallic material, such as aluminum, stainless steel, nickel-plated material, titanium, or tantalum, or a carbon material, such as a carbon cloth or carbon paper. Preferred of these are metallic materials. Especially preferred is aluminum. With respect to the shape, examples thereof in the case of metallic materials include metal foils, metal cylinders, metal coils, metal sheets, thin metal films, expanded metals, punched metals, and foamed metals. In the case of carbon materials, examples of the shape include carbon plates, thin carbon films, and carbon cylinders. Of these, thin metal films are preferred because they are currently used in products industrially produced. A thin film in a suitable mesh form may be used.

In the case where a thin film is used as the positive-electrode current collector, it may have any desired thickness. However, it is preferred that the thickness thereof is generally 1 μm or larger, preferably 3 μm or larger, more preferably 5 μm or larger, and is generally 100 mm or smaller, preferably 1 mm or smaller, more preferably 50 μm or smaller. In case where the thickness thereof is small beyond that range, there is a possibility that the film might not have the strength required of current collectors. On the other hand, in case where the thickness thereof is large beyond that range, there is a possibility that handleability might be impaired.

The binder to be used for forming the positive-electrode active-material layer is not particularly limited. In the case of forming the layer through coating, the binder may be any material which is stable to the liquid medium to be used for electrode production. Examples thereof include resinous polymers such as polyethylene, polypropylene, poly(ethylene terephthalate), poly(methyl methacrylate), aromatic polyamides, cellulose, and nitrocellulose, rubbery polymers such as SBR (styrene/butadiene rubbers), NBR (acrylonitrile/butadiene rubbers), fluororubbers, isoprene rubbers, butadiene rubbers, and ethylene/propylene rubbers, thermoplastic elastomer polymers such as styrene/butadiene/styrene block copolymers and products of hydrogenation thereof, EPDM (ethylene/propylene/diene terpolymers), styrene/ethylene/butadiene/ethylene copolymers, and styrene/isoprene/styrene block copolymers and products of hydrogenation thereof, flexible resinous polymers such as syndiotactic 1,2-polybutadiene, poly(vinyl acetate), ethylene/vinyl acetate copolymers, and propylene/α-olefin copolymers, fluoropolymers such as poly(vinylidene fluoride), polytetrafluoroethylene, fluorinated poly(vinylidene fluoride), and polytetrafluoroethylene/ethylene copolymers, and polymer compositions having the property of conducting alkali metal ions (especially lithium ions). These substances may be used alone, or any desired two or more thereof may be used in combination in any desired proportion.

The proportion of the binder in the positive-electrode active-material layer is generally 0.1% by weight or higher, preferably 1% by weight or higher, more preferably 5% by weight or higher, and is generally 80% by weight or lower, preferably 60% by weight or lower, more preferably 40% by weight or lower, most preferably 10% by weight or lower. In case where the proportion of the binder is too low, there is a possibility that the positive electrode might have insufficient mechanical strength because the positive-electrode active material cannot be sufficiently held, resulting in deterioration of battery performances such as cycle characteristics. On the other hand, too high binder proportions may lead to a decrease in battery capacity or electrical conductivity.

A conductive material is generally incorporated into the positive-electrode active-material layer in order to heighten electrical conductivity. The kind of the conductive material is not particularly limited. Examples thereof include metallic materials such as copper and nickel and carbon materials such as graphites, e.g., natural graphite and artificial graphites, carbon blacks, e.g., acetylene black, and amorphous carbons, e.g., needle coke. One of these substances may be used alone, or any desired two or more thereof may be used in combination in any desired proportion. The proportion of the conductive material in the positive-electrode active-material layer is generally 0.01% by weight or higher, preferably 0.1% by weight or higher, more preferably 1% by weight or higher, and is generally 50% by weight or lower, preferably 30% by weight or lower, more preferably 15% by weight or lower. Too low proportions of the conductive material may result in insufficient electrical conductivity, while too high proportions thereof may result in a reduced battery capacity.

The liquid medium to be used for preparing a slurry is not particularly limited in kind as long as the powder of a layered lithium-nickel composite oxide as a positive-electrode material, the binder, and the conductive material and thickener which are used according to need can be dissolved or dispersed therein. Either an aqueous solvent or an organic solvent may be used. Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. In particular, when an aqueous solvent is used, a dispersant is used in combination with the thickener and a latex of SBR or the like is used for slurry preparation. One of those solvents may be used alone, or any desired two or more thereof may be used in combination in any desired proportion.

The content of the powder of a layered lithium-nickel-manganese-cobalt composite oxide of the invention as a positive-electrode material in the positive-electrode active-material layer is generally 10% by weight or higher, preferably 30% by weight or higher, more preferably 50% by weight or higher, and is generally 99.9% by weight or lower, preferably 99% by weight or lower. In case where the proportion of the powder of a layered lithium-nickel-manganese-cobalt composite oxide in the positive-electrode active-material layer is too high, the positive electrode tends to have insufficient strength. Too low proportions thereof may result in an insufficient capacity.

The thickness of the positive-electrode active-material layer is generally about from 10 μm to 200 μm.

It is preferred that the positive-electrode active-material layer obtained through coating and drying be pressed and densified with a roller press or the like in order to heighten the packing density of the positive-electrode active material.

[Lithium Secondary Battery]

The lithium secondary battery of the invention has: the positive electrode for lithium secondary battery of the invention, which is capable of intercalating/deintercalating lithium; a negative electrode capable of intercalating/deintercalating lithium; and a nonaqueous electrolyte containing a lithium salt as an electrolyte salt. A separator which holds the nonaqueous electrolyte may have been interposed between the positive electrode and the negative electrode. To thus interposing a separator is desirable for effectively preventing the positive electrode and negative electrode from coming into contact with each other to cause short-circuiting.

Like the positive electrode, the negative electrode is generally produced by forming a negative-electrode active-material layer on a negative-electrode current collector.

As the material of the negative-electrode current collector is generally used a metallic material, such as copper, nickel, stainless steel, or nickel-plated steel, or a carbon material, such as a carbon cloth or carbon paper. In the case of the metallic material among these, examples of the current collector include metal foils, metal cylinders, metal coils, metal sheets, and thin metal films. In the case of the carbon material, examples of the current collector include carbon plates, thin carbon films, and carbon cylinders. Of these, thin metal films are preferred because they are currently used in products industrially produced. A thin film in a suitable mesh form may be used. In the case where a thin metal film is used as the negative-electrode current collector, the preferred range of the thickness thereof is the same as that for the positive-electrode current collector described above.

The negative-electrode active-material layer comprises a negative-electrode active material. The negative-electrode active material is not particularly limited in kind as long as it is capable of electrochemically intercalating/deintercalating lithium ions. In general, however, a carbon material capable of intercalating and deintercalating lithium is used from the standpoint of high safety.

The carbon material is not particularly limited in kind. Examples thereof include graphites such as artificial graphites and natural graphite and products of organic-substance pyrolysis conducted under various pyrolysis conditions. Examples of the products of the pyrolysis of organic substances include products of the carbonization of coal coke, petroleum coke, and coal pitch, products of the carbonization of petroleum pitch, products of the carbonization of materials obtained by oxidizing these pitches, products of the carbonization of needle coke, pitch coke, phenolic resins, and crystalline cellulose, carbon materials obtained by partly graphitizing these carbonization products, and furnace black, acetylene black, and pitch-derived carbon fibers. Preferred of these are graphites. Especially preferred are artificial graphites produced by subjecting easily graphitizable pitches obtained from various raw materials to a high-temperature heat treatment, purified natural graphite, graphite materials comprising any of these graphites and a pitch incorporated therein, and the like. Ones which have undergone various surface treatments are mainly used. These carbon materials may be used alone or in combination of two or more thereof.

In the case where a graphite material is used as the negative-electrode active material, it preferably is one in which the value of d (interplanar spacing) for the lattice plane (002 plane), as determined by X-ray diffractometry by the method of the Japan Society for Promotion of Scientific Research, is generally 0.335 nm or larger and is generally 0.34 nm or smaller, preferably 0.337 nm or smaller.

The ash content of the graphite material preferably is generally 1% by weight or lower, in particular 0.5% by weight or lower, especially 0.1% by weight or lower, based on the weight of the carbon material.

The graphite material preferably further has a crystallite size (Lc), as determined by X-ray diffractometry by the method of the Japan Society for Promotion of Scientific Research, of generally 30 nm or larger, in particular 50 nm or larger, especially 100 nm or larger.

The median diameter of the graphite material, as determined by the laser diffraction/scattering method, preferably is generally 1 µm or larger, in particular 3 µm or larger, more preferably 5 µm or larger, especially 7 µm or larger, and is generally 100 µm or smaller, in particular 50 µm or smaller, more preferably 40 µm or smaller, especially 30 µm or smaller.

It is also preferred that the BET specific surface area of the graphite material is generally $0.5\ m^2/g$ or larger, preferably $0.7\ m^2/g$ or larger, more preferably $1.0\ m^2/g$ or larger, even more preferably $1.5\ m^2/g$ or larger, and is generally $25.0\ m^2/g$ or smaller, preferably $20.0\ m^2/g$ or smaller, more preferably $15.0\ m^2/g$ or smaller, even more preferably $10.0\ m^2/g$ or smaller.

Furthermore, the graphite material preferably is one which, when analyzed by Raman spectroscopy using argon laser light, has an intensity ratio $I_A/I_B$ of from 0 to 0.5, provided that $I_A$ is the intensity for the peak $P_A$ observed in the range of $1,580\text{-}1,620\ cm^{-1}$ and $I_B$ is the intensity for the peak $P_B$ observed in the range of $1,350\text{-}1,370\ cm^{-1}$. The half-value width of the peak $P_A$ is preferably $26\ cm^{-1}$ or smaller, more preferably $25\ cm^{-1}$ or smaller.

Besides the various carbon materials described above, other materials capable of intercalating and deintercalating lithium can be used as negative-electrode active materials. Examples of the negative-electrode active materials other than carbon materials include metal oxides such as tin oxide and silicon oxide, elemental lithium, and lithium alloys such as lithium-aluminum alloys. These materials other than carbon materials may be used alone or in combination of two or more thereof. These materials may be used in combination with any of the carbon materials described above.

Like the positive-electrode active-material layer, the negative-electrode active-material layer can generally be formed by slurrying the negative-electrode active material and a binder optionally together with a conductive material and a thickener using a liquid medium, applying the slurry to a negative-electrode current collector, and drying it. The liquid medium, binder, thickener, conductive material, and other ingredients to be used for slurry preparation may be the same as those described above with regard to the positive-electrode active-material layer.

As the electrolyte can be used, for example, a known organic electrolyte solution, solid polymer electrolyte, gel-form electrolyte, or solid inorganic electrolyte. Preferred of these is an organic electrolyte solution. The organic electrolyte solution is prepared by dissolving a solute (electrolyte) in an organic solvent.

The kind of the organic solvent is not particularly limited, and use can be made of, for example, a carbonate, ether, ketone, sulfolane compound, lactone, nitrile, chlorinated hydrocarbon, ether, amine, ester, amide, or phosphoric ester compound. Typical examples thereof include dimethyl carbonate, diethyl carbonate, propylene carbonate, ethylene carbonate, vinylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1,3-dioxolane, 4-methyl-1,3-dioxolane, diethyl ether, sulfolane, methylsulfolane, acetonitrile, propionitrile, benzonitrile, butyronitrile, valeronitrile, 1,2-dichloroethane, dimethylformamide, dimethyl sulfoxide, trimethyl phosphate, and triethyl phosphate. These may be used alone or as a mixed solvent comprising two or more thereof.

The organic solvent preferably contains a high-permittivity solvent so as to dissociate the electrolyte salt. The term high-permittivity solvent herein means a compound having a relative permittivity as measured at 25° C. of 20 or higher. Preferred among high-permittivity solvents which can be incorporated in the electrolyte solution are ethylene carbonate, propylene carbonate, and compounds obtained by replacing one or more hydrogen atoms of these carbonates with one or more of other elements, e.g., halogens, alkyl groups, etc. The proportion of the high-permittivity solvent in the electrolyte solution is preferably 20% by weight or higher, more preferably 30% by weight or higher, most preferably 40% by weight or higher. When the content of the high-permittivity solvent is low beyond that range, there are cases where desired battery performances are not obtained.

The kind of the lithium salt to be used as the electrolyte salt also is not particularly limited, and any desired known solute can be used. Examples thereof include $LiClO_4$, $LiAsF_6$, $LiPF_6$, $LiBF_4$, $LiB(C_6H_5)_4$, LiBOB, LiCl, LiBr, $CH_3SO_3Li$, $CF_3SO_3Li$, $LiN(SO_2CF_3)_2$, $LiN(SO_2C_2F_5)_2$, $LiC(SO_2CF_3)_3$, and $LiN(SO_3CF_3)_2$. Any desired one of these electrolyte salts may be used alone, or any desired two or more thereof may be used in combination in any desired proportion.

The lithium salt as an electrolyte salt is contained in the electrolyte solution in an amount of generally from 0.5 mol/L to 1.5 mol/L. When the lithium salt concentration in the electrolyte solution is either lower than 0.5 mol/L or higher than 1.5 mol/L, there are cases where electrical conductivity decreases and this adversely influences battery properties. The lower limit and upper limit thereof are preferably 0.75 mol/L or higher and 1.25 mol/L or lower, respectively.

An additive which forms on the negative-electrode surface a satisfactory coating film which enables efficient charge/discharge of lithium ions may be added to the electrolyte solution in any desired proportion. The additive is, for example, a gas such as $CO_2$, $N_2O$, CO, or $SO_2$, vinylene carbonate, vinylethylene carbonate, polysulfide $S_x^{2-}$, or the like.

In the case of using a solid polymer electrolyte also, the kind thereof is not particularly limited and any desired crystalline/amorphous inorganic substance known as a solid electrolyte can be used. Examples of the crystalline solid inorganic electrolyte include LiI, $Li_3N$, $Li_{1+x}J_xTi_{2-x}(PO_4)_3$ (J=Al, Sc, Y, La), and $Li_{0.5-3x}RE_{0.5+x}TiO_3$ (RE=La, Pr, Nd, Sm). Examples of the amorphous solid inorganic electrolyte include oxide glasses such as $4.9LiI-34.1Li_2O-61B_2O_5$ and $33.3Li_2O-66.7SiO_2$. Any desired one of these may be used alone, or any desired two or more thereof may be used in combination in any desired proportion.

In the case where the organic electrolyte solution described above is used as an electrolyte, a separator is interposed between the positive electrode and negative electrode in order to prevent short-circuiting between the electrodes. Although the material and shape of the separator are not particularly limited, the separator preferably is one which is stable to the organic electrolyte solution to be used, has the excellent ability to retain the electrolyte solution, and can prevent short-circuiting between the electrodes without fail. Preferred examples thereof include microporous films, sheets, and non-woven fabrics made of various polymeric materials. Examples of the polymeric materials include nylons, cellulose acetate, nitrocellulose, polysulfones, polyacrylonitrile, poly(vinylidene fluoride), and polyolefin polymers such as polypropylene, polyethylenes, and polybutene. Polyolefin polymers are preferred especially from the standpoint of chemical and electrochemical stability, which is an important factor in separators. From the standpoint of self-shutoff temperature, which is one of the purposes of the use of a separator in cells, polyethylenes are especially desirable.

In the case of using a separator made of a polyethylene, the polyethylene preferably is ultrahigh-molecular polyethylene from the standpoint of high temperature shape retentivity. The lower limit of the molecular weight thereof is preferably 500,000, more preferably 1,000,000, most preferably 1,500,000. On the other hand, the upper limit of the molecular weight thereof is preferably 5,000,000, more preferably 4,000,000, most preferably 3,000,000. This is because a polyethylene having too high a molecular weight has too low flowability and use of this polyethylene results in cases where pores of the separator do not close upon heating.

The lithium secondary battery of the invention is produced by assembling the positive electrode for lithium secondary battery of the invention, negative electrode, and electrolyte described above into an adequate shape optionally together with the separator described above. It is possible to use other constituent elements, e.g., an outer case, according to need.

The shape of the lithium secondary battery of the invention is not particularly limited, and one suitable for the intended use of the cell can be selected from various shapes generally employed. Examples of the shapes in general use include the cylinder type in which sheet electrodes and separators are spirally packed, the cylinder type of the inside-out structure employing a combination of pellet electrodes and a separator, and the coin type in which pellet electrodes and a separator are superposed. Methods for battery fabrication also are not particularly limited, and a suitable one can be selected from various methods in general use according to the intended battery shape.

General embodiments of the lithium secondary battery of the invention were explained above. However, the lithium secondary battery of the invention should not be construed as being limited to those embodiments, and various modifications can be made in carrying out the invention as long as they do not depart from the spirit of the invention.

EXAMPLES

The invention will be explained below in more detail by reference to Examples and Comparative Examples, but the invention should not be construed as being limited to the following Examples unless the invention departs from the spirit thereof. Properties of the layered lithium-nickel-manganese-cobalt composite oxides produced were examined in the following manners.

Crystalline phase: Identified from an X-ray powder diffraction pattern.

Specific surface area S: Determined by the BET method.

Average primary-particle diameter B: Determined from an SEM image having a magnification of 30,000 diameters.

Secondary-particle median diameter A: Measurement was made after a 5-minute ultrasonic dispersion treatment.

90% Diameter of secondary particles in cumulative distribution ($D_{90}$): Measurement was made after a 5-minute ultrasonic dispersion treatment.

Bulk density: Determined by placing 5-10 g of a sample powder in a 10-mL measuring cylinder made of glass, tapping this cylinder 200 times over a stroke of about 20 mm, and measuring the density of the powder thus packed.

Concentration of carbon contained C: Carbon/sulfur analyzer EMIA-520, manufactured by Horiba Ltd., was used. Tens of milligrams to 100 mg of a sample was weighed out and placed in a pre-burned porcelain crucible. A combustion aid was added thereto, and carbon was extracted by combustion in an oxygen stream in a high-frequency heating furnace. The amount of the $CO_2$ contained in the combustion gas was determined by nondispersive infrared absorptiometry. For sensitivity calibration was used 150-15 low alloy steel No. 1 (guarantee carbon content: 0.469% by weight) manufactured by Japan Iron and Steel Federation.

Volume resistivity: A powder resistivity measuring apparatus (powder resistivity measuring system Loresta GP, manufactured by DIA Instruments Co., Ltd.) was used to measure the volume resistivities [$\Omega \cdot cm$] of sample powders compacted at various pressures using a probe unit for powders (four-probe ring electrode; electrode spacing, 5.0 mm; electrode radius, 1.0 mm; sample radius, 12.5 mm) under the conditions of a sample weight of 3 g and an applied-voltage limiter of 90 V. The values of volume resistivity as measured under a pressure of 40 MPa were compared.

The median diameter, as an average particle diameter, of the pulverized particles in a slurry was determined from volume-based particle diameters measured with a known laser diffraction/scattering particle size distribution analyzer with the refractive index set at 1.24.

The median diameter, as an average particle diameter, of the LIOH powder used as a raw material was determined from volume-based particle diameters measured with a known laser diffraction/scattering particle size distribution analyzer with the refractive index set at 1.14. In this measurement, ethyl alcohol was used as a dispersion medium and the measurement was made after preparation of a saturated lithium hydroxide solution and a subsequent 5-minute ultrasonic dispersion treatment. Furthermore, the form of each particulate powder obtained by spray drying was ascertained through an examination with an SEM and a section examination with an SEM. The median diameter thereof as an average particle diameter and the 90% diameter in cumulative distribution ($D_{90}$) thereof were determined from volume-based particle diameters measured with a known laser diffraction/scattering particle size distribution analyzer with the refractive index set at 1.24. The specific surface area thereof was measured by the BET method.

Example 1

$Ni(OH)_2$, $Mn_3O_4$, and $Co(OH)_2$ were mixed together in such weighed amounts as to result in an Ni:Mn:Co molar ratio of 1:1:1. Thereafter, pure water was added thereto to prepare a slurry. Using a circulating wet pulverizer of the dispersing medium agitation type, the slurry was stirred to pulverize the solid ingredients in the slurry to a median diameter of 0.15 μm.

The slurry was spray-dried with a spray dryer to obtain a particulate powder (a powder composed of solid secondary particles formed by the aggregation of primary particles; average particle diameter (median diameter), 11.7 μm; BET specific surface area, 46 $m^2/g$). An LiOH powder pulverized to an average particle diameter (median diameter) of 20 μm or smaller was added to the particulate powder in a proportion of 1.10 in terms of Li/(Ni+Mn+Co) molar ratio. About 6 g of these powders which had not been mixed together were placed in a 100-mL wide-mouth polyethylene bottle, which was then tightly capped. This bottle was shaken by hand for 20 minutes over a stroke of about 20 cm at a frequency of about 160 times per minute. The resultant unburned mixture was introduced into a crucible made of alumina and burned (heating rate, 5° C./min) at 950° C. for 10 hours in an air stream. Thereafter, the product of the calcination was disaggregated to obtain a lithium-nickel-manganese-cobalt composite oxide of a layered structure which had the composition $Li_{1.09}Ni_{0.33}Mn_{0.33}Co_{0.34}O_2$. This composite oxide had an average primary-particle diameter B of 0.5 μm, median diameter A of 10.8 μm, 90% diameter in cumulative distribution ($D_{90}$) of 17.8 μm, bulk density of 2.0 g/cc, BET specific surface area of 1.053 $m^2/g$, and concentration of carbon contained of 0.020% by weight. The value of C/S was 0.019. The volume resistivity thereof was $1.8 \times 10^4$ Ω·cm.

Example 2

$Ni(OH)_2$, $Mn_3O_4$, and $Co(OH)_2$ were mixed together in such weighed amounts as to result in an Ni:Mn:Co molar ratio of 2:2:1. Thereafter, pure water was added thereto to prepare a slurry. Using a circulating wet pulverizer of the dispersing medium agitation type, the slurry was stirred to pulverize the solid ingredients in the slurry to a median diameter of 0.15 μm.

The slurry was spray-dried with a spray dryer to obtain a particulate powder (a powder composed of solid secondary particles formed by the aggregation of primary particles; average particle diameter, 8.9 μm; BET specific surface area, 48 $m^2/g$). An LiOH powder pulverized to an average particle diameter of 20 μm or smaller was added to the particulate powder in a proportion of 1.10 in terms of Li/(Ni+Mn+Co) molar ratio. About 13 g of these powders which had not been mixed together were placed in a 100-mL wide-mouth polyethylene bottle, which was then tightly capped. This bottle was shaken by hand for 20 minutes. The resultant unburned mixture was introduced into a crucible made of alumina and burned (heating rate, 5° C./min) at 950° C. for 10 hours in an air stream. Thereafter, the product of the calcination was disaggregated to obtain a lithium-nickel-manganese-cobalt composite oxide of a layered structure which had the composition $Li_{1.06}Ni_{0.40}Mn_{0.40}Co_{0.20}O_2$. This composite oxide had an average primary-particle diameter B of 0.5 μm, median diameter A of 8.6 μm, 90% diameter in cumulative distribution ($D_{90}$) of 13.8 μm, bulk density of 1.7 g/cc, BET specific surface area of 1.238 $m^2/g$, and concentration of carbon contained of 0.025% by weight. The value of C/S was 0.020. The volume resistivity thereof was $3.1 \times 10^4$ Ω·cm.

Example 3

$Ni(OH)_2$, $Mn_3O_4$, and $Co(OH)_2$ were mixed together in such weighed amounts as to result in an Ni:Mn:Co molar ratio of 1:1:1. Thereafter, pure water was added thereto to prepare a slurry. Using a circulating wet pulverizer of the dispersing medium agitation type, the slurry was stirred to pulverize the solid ingredients in the slurry to an average diameter of 0.21 μm.

The slurry was spray-dried with a spray dryer to obtain a particulate powder (a powder composed of solid secondary particles formed by the aggregation of primary particles; average particle diameter, 11.8 μm; BET specific surface area, 68 $m^2/g$). An LiOH powder pulverized to an average particle diameter of 20 μm or smaller was added to the particulate powder in a proportion of 1.10 in terms of Li/(Ni+Mn+Co) molar ratio. About 3 kg of these powders which had not been mixed together were mixed for 1 hour by means of a high-speed mixer in a nitrogen atmosphere at an agitator rotation speed of 300 rpm/min and a chopper rotation speed of 3,000 rpm/min. The resultant unburned mixture was introduced into a square pot made of alumina and burned (heating rate, 5° C./min) at 990° C. for 12 hours in an air stream. Thereafter, the product of the calcination was disaggregated to obtain a lithium-nickel-manganese-cobalt composite oxide of a layered structure which had the composition $Li_{1.04}Ni_{0.33}Mn_{0.33}Co_{0.34}O_2$. This composite oxide had an average primary-particle diameter B of 1 μm, median diameter A of 10.5 μm, 90% diameter in cumulative distribution ($D_{90}$) of 16.7 μm, bulk density of 2.1 g/cc, BET specific surface area of 0.560 $m^2/g$, and concentration of carbon contained of 0.0097% by weight. The value of C/S was 0.017. The volume resistivity thereof was $1.7 \times 10^4$ Ω·cm.

Comparative Example 1

A slurry prepared in the same manner as in Example 1 was spray-dried with a spray dryer to obtain a particulate powder (BET specific surface area, 46 $m^2/g$). An LiOH powder pulverized to an average particle diameter of 20 μm or smaller was added to the particulate powder in a proportion of 1.20 in terms of Li/(Ni+Mn+Co) molar ratio. About 6 g of these powders which had not been mixed together were placed in a 100-mL wide-mouth polyethylene bottle, which was then tightly capped. This bottle was shaken by hand for 20 minutes. The resultant unburned mixture was introduced into a crucible made of alumina and burned (heating rate, 5° C./min) at 950° C. for 10 hours in an air stream. Thereafter, the product of the calcination was disaggregated to obtain a lithium-nickel-manganese-cobalt composite oxide of a layered structure which had the composition $Li_{1.20}Ni_{0.33}Mn_{0.33}Co_{0.34}O_2$.

This composite oxide had an average primary-particle diameter B of 0.5 µm, median diameter A of 11.2 µm, 90% diameter in cumulative distribution ($D_{90}$) of 18.5 µm, bulk density of 2.0 g/cc, BET specific surface area of 0.817 m$^2$/g, and concentration of carbon contained of 0.029% by weight. The value of C/S was 0.035. The volume resistivity thereof was 3.6×10$^3$ Ω·cm.

Comparative Example 2

A slurry prepared in the same manner as in Example 2 was spray-dried with a spray dryer, without being subjected to a wet pulverization treatment, to obtain a particulate powder (BET specific surface area, 48 m$^2$/g). An LiOH powder pulverized to an average particle diameter of 20 µm or smaller was added to the particulate powder in a proportion of 1.05 in terms of Li/(Ni+Mn+Co) molar ratio. About 13 g of these powders which had not been mixed together were placed in a 100-mL wide-mouth polyethylene bottle, which was then tightly capped. This bottle was shaken by hand for 20 minutes. The resultant unburned mixture was introduced into a crucible made of alumina and burned (heating rate, 5° C./min) at 950° C. for 10 hours in an air stream. Thereafter, the product of the calcination was disaggregated to obtain a lithium-nickel-manganese-cobalt composite oxide of a layered structure which had the composition $Li_{0.99}Ni_{0.40}Mn_{0.40}Co_{0.20}O_2$.

This composite oxide had an average primary-particle diameter B of 0.5 µm, median diameter A of 8.3 µm, 90% diameter in cumulative distribution ($D_{90}$) of 12.9 µm, bulk density of 1.8 g/cc, BET specific surface area of 1.010 m$^2$/g, and concentration of carbon contained of 0.014% by weight. The value of C/S was 0.014. The volume resistivity thereof was 6.1×10$^6$ Ω·cm.

Comparative Example 3

To a powder of a coprecipitated composite hydroxide having an Ni:Mn:Co molar ratio of 1:1:1 (BET specific surface area, 6 m$^2$/g) was added an LiOH powder pulverized to an average particle diameter of 20 µm or smaller in a proportion of 1.10 in terms of Li/(Ni+Mn+Co) molar ratio. About 13 g of these powders which had not been mixed together were placed in a 100-mL wide-mouth polyethylene bottle, which was then tightly capped. This bottle was shaken by hand for 20 minutes. The resultant unburned mixture was introduced into a square pot made of alumina and burned (heating rate, 5° C./min) at 900° C. for 12 hours in an air stream. Thereafter, the product of the calcination was disaggregated to obtain a lithium-nickel-manganese-cobalt composite oxide of a layered structure which had the composition $Li_{1.03}Ni_{0.33}Mn_{0.33}Co_{0.34}O_2$.

This composite oxide had an average primary-particle diameter B of 1 µm, median diameter A of 14.4 µm, 90% diameter in cumulative distribution ($D_{90}$) of 20.0 µm, bulk density of 2.4 g/cc, BET specific surface area of 0.460 m$^2$/g, and concentration of carbon contained of 0.043% by weight. The value of C/S was 0.093. The volume resistivity thereof was 4.6×10$^4$ Ω·cm.

Comparative Example 4

$Ni(OH)_2$, $Mn_3O_4$, and $Co(OH)_2$ were mixed together in such weighed amounts as to result in an Ni:Mn:Co molar ratio of 19:19:2. Thereafter, pure water was added thereto to prepare a slurry. Using a circulating wet pulverizer of the dispersing medium agitation type, the slurry was stirred to pulverize the solid ingredients in the slurry to a median diameter of 0.16 µm.

The slurry was spray-dried with a spray dryer to obtain a particulate powder (a powder composed of solid secondary particles formed by the aggregation of primary particles; average particle diameter, 11.5 µm; BET specific surface area, 46 m$^2$/g). An LiOH powder pulverized to an average particle diameter of 20 µm or smaller was added to the particulate powder in a proportion of 1.20 in terms of Li/(Ni+Mn+Co) molar ratio. About 26.5 g of these powders which had not been mixed together were placed in a 250-mL wide-mouth polyethylene bottle, which was then tightly capped. This bottle was shaken by hand for 20 minutes. The resultant unburned mixture was introduced into a crucible made of alumina and burned (heating rate, 5° C./min) at 950° C. for 10 hours in an air stream. Thereafter, the product of the calcination was disaggregated to obtain a lithium-nickel-manganese-cobalt composite oxide of a layered structure which had the composition $Li_{1.18}Ni_{0.47}Mn_{0.48}Co_{0.05}O_2$.

This composite oxide had an average primary-particle diameter B of 0.6 µm, median diameter A of 10.5 µm, 90% diameter in cumulative distribution ($D_{90}$) of 16.9 µm, bulk density of 1.8 g/cc, BET specific surface area of 1.085 m$^2$/g, and concentration of carbon contained of 0.038% by weight. The value of C/S was 0.035. The volume resistivity thereof was 1.1×10$^4$ Ω·cm.

<Battery Fabrication and Evaluation>

The powders of layered lithium-nickel-manganese-cobalt composite oxides produced in Examples 1 to 3 and Comparative Examples 1 to 4 were used to fabricate batteries in the following manners, and these batteries were evaluated by the following methods.

(1) Initial Charge/Discharge Capacity:

Weighed amounts of raw materials consisting of 75% by weight each of the layered lithium-nickel-manganese-cobalt composite oxide powders produced in Examples 1 to 3 and Comparative Examples 1 to 4, 20% by weight acetylene black, and 5% by weight polytetrafluoroethylene powder were sufficiently mixed together by means of a mortar. This mixture was formed into a thin sheet, and a piece was punched out of this sheet with a 9-mmφ punch. The sheet formation was conducted so that the disk piece had an overall weight of about 8 mg. This disk piece was press-bonded to an expanded aluminum metal to obtain a 9-mmφ positive electrode.

A coin cell was fabricated using the 9-mmφ positive electrode as a test electrode and a lithium metal sheet as a counter electrode and further using an electrolyte solution prepared by dissolving LiPF$_6$ in a solvent composed of EC (ethylene carbonate):DMC (dimethyl carbonate):EMC (ethyl methyl carbonate)=3:3:4 (by volume) in a concentration of 1 mol/L and a porous polyethylene film having a thickness of 25 µm as a separator.

The coin cell obtained was subjected to charge/discharge at a constant current of 0.2 mA/cm$^2$, an upper-limit charge voltage of 4.3 V, and a lower-limit discharge voltage of 3.0 V. The charge/discharge capacities (mAh/g) in this operation were measured, and the results thereof are shown in Table 2. As a criterion for acceptance judgment in the Examples was used a discharge capacity value of 160 mAh/g or higher.

(2) Low-Temperature Load Characteristics Test:

Weighed amounts of raw materials consisting of 75% by weight each of the layered lithium-nickel-manganese-cobalt composite oxide powders produced in Examples 1 to 3 and Comparative Examples 1 to 4, 20% by weight acetylene black, and 5% by weight polytetrafluoroethylene powder were sufficiently mixed together by means of a mortar. This mixture was formed into a thin sheet, and pieces were punched out of this sheet with a 9-mmφ punch and a 12-mmφ punch. The sheet formation was conducted so that the disk pieces had overall weights of about 8 mg and about 18 mg, respectively. These disk pieces were press-bonded to an expanded aluminum metal to obtain 9-mmφ and 12-mmφ positive electrodes.

A coin cell was fabricated using the 9-mmφ positive electrode as a test electrode and a lithium metal sheet as a counter electrode and further using an electrolyte solution prepared by dissolving $LiPF_6$ in a solvent composed of EC (ethylene carbonate):DMC (dimethyl carbonate):EMC (ethyl methyl carbonate)=3:3:4 (by volume) in a concentration of 1 mol/L and a porous polyethylene film having a thickness of 25 μm as a separator.

The coin cell obtained was subjected to constant-current constant-voltage charge at 0.2 mA/cm². Namely, the reaction in which lithium ions were released from the positive electrode was conducted to an upper limit of 4.2 V. Subsequently, discharge at a constant current of 0.2 mA/cm², i.e., the reaction in which lithium ions were occluded in the positive electrode, was conducted to a lower limit of 3.0 V. The initial charge capacity and initial discharge capacity per unit weight of the positive-electrode active material in this operation are expressed as Qs(C) [mAh/g] and Qs(D) [mAh/g], respectively.

A graphite powder having an average particle diameter of 8-10 μm ($d_{002}$=3.35 Å) and poly(vinylidene fluoride) were used as a negative-electrode active material and a binder, respectively. Weighed amounts of these were mixed together in a ratio of 92.5:7.5 by weight in N-methylpyrrolidone solution to prepare a negative-electrode mix slurry. This slurry was applied to one side of a copper foil having a thickness of 20 μm and dried to vaporize the solvent. Thereafter, a 12-mmφ piece was punched out of the coated foil and pressed at 0.5 ton/cm² to obtain a negative electrode. The coating operation was conducted so that the amount of the negative-electrode active material on the electrode became about 5-12 mg.

A cell was fabricated using the negative electrode and lithium metal as a test electrode and a counter electrode, respectively. This cell was subjected to a test in which lithium ions were occluded in the negative electrode by the constant-current constant-voltage method under the conditions of 0.2 mA/cm² and 3 mV (cut current, 0.05 mA) to a lower limit of 0 V. The initial occlusion capacity per unit weight of the negative-electrode active material in this test is expressed as Qf [mAh/g].

The positive electrode and negative electrode were used in combination together with a coin cell case to fabricate a test battery, and battery performances thereof were evaluated.

Namely, the positive electrode produced was placed on the positive-electrode can of the coin cell case, and a porous polyethylene film having a thickness of 25 μm was placed thereon as a separator. These components were pressed with a gasket made of polypropylene. Thereafter, an electrolyte solution prepared by dissolving $LiPF_6$ in a solvent composed of EC (ethylene carbonate):DMC (dimethyl carbonate):EMC (ethyl methyl carbonate)=3:3:4 (by volume) in a concentration of 1 mol/L was introduced as a nonaqueous electrolyte solution into the can to sufficiently infiltrate it into the separator. The negative electrode was then placed and a negative-electrode can was further placed thereon. The resultant assembly was sealed to produce a coin type lithium secondary battery. In this cell fabrication, a balance between the weight of the positive-electrode active material and the weight of the negative-electrode active material was set so that the following expression was almost satisfied:

Weight of positive-electrode active material[g]/weight of negative-electrode active material[g]=(Qf [mAh/g]/1.2)Qs(C)[mAh/g]

In order to examine the low-temperature load characteristics of the cell thus obtained, the following test was conducted, with the one-hour rate current value for the battery, i.e., 1 C, defined as follows:

1C[mA]=Qs(D)×(weight of positive-electrode active material[g])/h

First, two cycles of charge/discharge at a constant current of 0.2 C and one cycle of charge/discharge at a constant current of 1 C were conducted at room temperature. In these cycles, the upper-limit charge voltage and the lower-limit voltage were set at 4.1 V and 3.0 V, respectively. Subsequently, the coin cell which had been regulated so as to have a charge depth of 40% by ⅓ C constant current charge/discharge was held in a −30° C. low-temperature atmosphere for 1 hour or more and then discharged at a constant current of 0.5 C [mA] for 10 seconds. The voltage of the cell as measured after the 10-second discharge and the voltage thereof as measured before the discharge are expressed as V [mV] and $V_0$ [mV], respectively, and the value of resistance R [Ω] was calculated using the following equation, wherein $\Delta V = V - V_0$.

R[Ω]=ΔV[mV]/0.5C[mA]

In Tables 1 and 2 are shown the found values of resistance in the cells which respectively employed the layered lithium-nickel-manganese-cobalt composite oxides of Examples 1 to 3 and Comparative Examples 1 to 4 as positive-electrode active materials. The smaller the value of resistance, the better the low-temperature load characteristics. As a criterion for acceptance judgment in the Examples was used a resistance value of 400Ω or lower.

[Table 1]

TABLE 1

Composition and properties of layered lithium-nickel-manganese-cobalt composite oxide

| Example | Composition | Average primary particle diameter B (μm) | Secondary particle median diameter A (μm) | 90% Diameter in cumulative distribution ($D_{90}$) (μm) | Bulk density (g/cc) | BET specific surface area, S (m²/g) | Concentration of carbon contained, C (wt %) |
|---|---|---|---|---|---|---|---|
| Example 1 | $Li_{1.09}Ni_{0.33}Mn_{0.33}Co_{0.34}O_2$ | 0.5 | 10.8 | 17.8 | 2.0 | 1.053 | 0.020 |
| Example 2 | $Li_{1.06}Ni_{0.40}Mn_{0.40}Co_{0.20}O_2$ | 0.5 | 8.6 | 13.8 | 1.7 | 1.238 | 0.025 |
| Example 3 | $Li_{1.04}Ni_{0.33}Mn_{0.33}Co_{0.34}O_2$ | 1 | 10.5 | 16.7 | 2.1 | 0.560 | 0.0097 |
| Comparative Example 1 | $Li_{1.20}Ni_{0.33}Mn_{0.33}Co_{0.34}O_2$ | 0.5 | 11.2 | 18.5 | 2.0 | 0.817 | 0.029 |
| Comparative Example 2 | $Li_{0.99}Ni_{0.40}Mn_{0.40}Co_{0.20}O_2$ | 0.5 | 8.3 | 12.9 | 1.8 | 1.010 | 0.014 |

TABLE 1-continued

Composition and properties of layered lithium-nickel-manganese-cobalt composite oxide

| Example | Composition | Average primary particle diameter B (μm) | Secondary particle median diameter A (μm) | 90% Diameter in cumulative distribution ($D_{90}$) (μm) | Bulk density (g/cc) | BET specific surface area, S (m²/g) | Concentration of carbon contained, C (wt %) |
|---|---|---|---|---|---|---|---|
| Comparative Example 3 | $Li_{1.03}Ni_{0.33}Mn_{0.33}Co_{0.34}O_2$ | 1 | 14.4 | 20.0 | 2.4 | 0.460 | 0.043 |
| Comparative Example 4 | $Li_{1.18}Ni_{0.47}Mn_{0.48}Co_{0.05}O_2$ | 0.6 | 10.5 | 16.9 | 1.8 | 1.085 | 0.038 |

TABLE 2

| | Properties of layered lithium-nickel-manganese cobalt composite oxide | | Evaluation results | | |
|---|---|---|---|---|---|
| | | | Initial charge/discharge | Low-temperature | |
| Example | Volume resistivity (Ω·cm) | C/S (—) | capacities (mAh/g) | resistance (Ω) | Evaluation results (*) |
| Example 1 | $1.8 \times 10^4$ | 0.019 | 176/160 | 268 | acceptable |
| Example 2 | $3.1 \times 10^4$ | 0.020 | 181/164 | 395 | acceptable |
| Example 3 | $1.7 \times 10^4$ | 0.017 | 178/160 | 301 | acceptable |
| Comparative Example 1 | $3.6 \times 10^3$ | 0.035 | 162/146 | 309 | unacceptable |
| Comparative Example 2 | $6.1 \times 10^6$ | 0.014 | 179/163 | 499 | unacceptable |
| Comparative Example 3 | $4.6 \times 10^4$ | 0.093 | 180/158 | 440 | unacceptable |
| Comparative Example 4 | $1.1 \times 10^4$ | 0.035 | 163/143 | 520 | unacceptable |

(*) Evaluation criteria: initial charge/discharge capacity, ≧160 mAh/g low-temperature resistance, ≦400 Ω

The following are apparent from Tables 1 and 2.

In Comparative Example 1, since the lithium amount was too large, unreacted lithium was apt to remain as a carbonate. It is presumed that lithium carbonate is present on the surface of and at grain boundaries of the positive-electrode active material. The composite oxide hence has a large value of C/S and the battery has low initial charge/discharge capacities.

In Comparative Example 2, since the lithium amount was too small, the composite oxide has low electrical conductivity and the battery has high low-temperature resistance.

In Comparative Example 3, the nickel-manganese-cobalt powder to be mixed with lithium was one prepared by the coprecipitation method and having a small BET specific surface area. The powder hence had low reactivity with lithium during calcination and unreacted lithium remained as a carbonate. The composite oxide hence has a large value of C/S and the battery has high low-temperature resistance.

In Comparative Example 4, since the lithium amount was too large, unreacted lithium was apt to remain as a carbonate. It is presumed that lithium carbonate is present on the surface of and at grain boundaries of the positive-electrode active material. The composite oxide hence has a large value of C/S and the battery has low initial charge/discharge capacities and high low-temperature resistance.

In contrast, by using the layered lithium-nickel-manganese-cobalt composite oxide powders satisfying the specific values of volume resistivity and C/S according to the invention as positive-electrode materials, lithium secondary batteries are provided which have a satisfactory performance balance with high capacities and excellent low-temperature output characteristics.

While the invention has been described in detail and with reference to specific embodiments thereof, it will be apparent to one skilled in the art that various changes and modifications can be made therein without departing from the spirit and scope thereof.

This application is based on a Japanese patent application filed on Apr. 27, 2004 (Application No. 2004-131599), the entire contents thereof being herein incorporated by reference.

INDUSTRIAL APPLICABILITY

Applications of the lithium secondary battery of the invention are not particularly limited and the cell is usable in known various applications. Examples thereof include notebook type personal computers, pen-input personal computers, mobile personal computers, electronic book players, portable telephones, portable facsimile telegraphs, portable copiers, portable printers, headphone stereos, video movies, liquid-crystal televisions, handy cleaners, portable CDs, mini disks, transceivers, electronic pocketbooks, pocket calculators, memory cards, portable tape recorders, radios, backup power sources, motors, illuminators, toys, game appliances, clocks, stroboscopes, cameras, and power sources for motor vehicles.

The invention claimed is:

1. A powder of a layered lithium-nickel-manganese-cobalt composite oxide which is for use as a positive-electrode material for lithium secondary battery, which has a composition represented by the following formula (I), having a volume resistivity of $5 \times 10^5$ Ω·cm or lower in the state of being compacted at a pressure of 40 MPa, and having a value of C/S, wherein C is the concentration of carbon contained therein (% by weight) and S is the BET specific surface area thereof (m²/g), of 0.025 or smaller:

$$Li_{1+z}Ni_xMn_yCo_{1-x-y}O_\delta \qquad (I)$$

(wherein $0.04<z\leqq0.91$, $0.1\leqq x\leqq0.55$, $0.20\leqq y\leqq0.90$, $0.50\leqq x+y\leqq1$, and $1.9\leqq\delta\leqq3$), and wherein the powder contains carbon.

2. A powder of a layered lithium-nickel-manganese-cobalt composite oxide which is for use as a positive-electrode material for lithium secondary battery, characterized by having a composition represented by the following formula (II), having a volume resistivity of $5\times10^5$ Ω·cm or lower in the state of being compacted at a pressure of 40 MPa, and having a value of C/S, wherein C is the concentration of carbon contained therein (% by weight) and S is the BET specific surface area thereof (m²/g), of 0.025 or smaller:

$$Li_{1+z}Ni_xMn_yCo_{1-x-y}O_2 \quad (II)$$

(wherein $0<z\leqq0.15$, $0.20\leqq x\leqq0.55$, $0.20\leqq y\leqq0.55$, and $0.50\leqq x+y\leqq1$), and wherein the powder contains carbon.

3. The powder of a layered lithium-nickel-manganese-cobalt composite oxide for use as a positive-electrode material for lithium secondary battery according to claim 1 or 2, wherein in formula (I) and formula (II), the value of y/x, which indicates Mn/Ni atomic proportion, is $0.95\leqq y/x\leqq2.5$.

4. The powder of a layered lithium-nickel-manganese-cobalt composite oxide for use as a positive-electrode material for lithium secondary battery according to claims 1 or 2, wherein the concentration of carbon contained therein, C, is 0.025% by weight or lower.

5. The powder of a layered lithium-nickel-manganese-cobalt composite oxide for use as a positive-electrode material for lithium secondary battery according to claim 1 or 2, which has a bulk density of 1.5 g/cc or higher, an average primary-particle diameter B of 0.1-3 μm, and a secondary-particle median diameter A in the range of 3-20 μm.

6. The powder of a layered lithium-nickel-manganese-cobalt composite oxide for use as a positive-electrode material for lithium secondary battery according to claim 1 or 2, which has a BET specific surface area of 0.2-2.5 m²/g.

7. A process for producing the powder of a layered lithium-nickel-manganese-cobalt composite oxide for use as a positive-electrode material for lithium secondary battery according to claim 1 or 2, which comprises pulverizing at least one nickel compound, at least one manganese compound, and at least one cobalt compound in a liquid medium to an average particle diameter of 0.3 μm or smaller to prepare a slurry containing the compounds evenly dispersed therein, spray-drying the slurry to obtain a powder composed of secondary particles formed by the aggregation of primary particles, subsequently sufficiently mixing the powder with at least one lithium compound, and calcining the resultant mixture in an oxygenic gas atmosphere.

8. A positive electrode for lithium secondary battery, which comprises a current collector having thereon a positive-electrode active-material layer which comprises the powder of a layered lithium-nickel-manganese-cobalt composite oxide for use as a positive-electrode material for lithium secondary battery according to claim 1 or 2 and a binder.

9. A lithium secondary battery comprising a negative electrode capable of intercalating/deintercalating lithium, a non-aqueous electrolyte containing a lithium salt, and a positive electrode capable of intercalating/deintercalating lithium, wherein the positive electrode employed is the positive electrode for lithium secondary battery according to claim 8.

10. The powder of a layered lithium-nickel-manganese-cobalt composite oxide of claim 1, wherein the amount of carbon in the composite oxide is 0.020% by weight or lower.

11. The powder of a layered lithium-nickel-manganese-cobalt composite oxide of claim 1, wherein the amount of carbon in the composite oxide is 0.015% by weight or lower.

12. The powder of a layered lithium-nickel-manganese-cobalt composite oxide of claim 1, wherein the amount of carbon in the composite oxide is 0.010% by weight or lower.

13. The powder of a layered lithium-nickel-manganese-cobalt composite oxide of claim 1, wherein the volume resistivity is $2\times10^5$ Ω·cm or lower in the state of being compacted at a pressure of 40 MPa.

14. The powder of a layered lithium-nickel-manganese-cobalt composite oxide of claim 1, wherein the volume resistivity is $1\times10^5$ Ω·cm or lower in the state of being compacted at a pressure of 40 MPa.

15. The powder of a layered lithium-nickel-manganese-cobalt composite oxide of claim 1, wherein the volume resistivity is $2\times10^4$ Ω·cm or lower in the state of being compacted at a pressure of 40 MPa.

16. The powder of a layered lithium-nickel-manganese-cobalt composite oxide of claim 1, wherein the volume resistivity is $1\times10^4$ Ω·cm or lower in the state of being compacted at a pressure of 40 MPa.

17. The powder of a layered lithium-nickel-manganese-cobalt composite oxide of claim 1, wherein the value of C/S is 0.020 or smaller.

18. The powder of a layered lithium-nickel-manganese-cobalt composite oxide of claim 1, wherein the value of C/S is 0.017 or smaller.

19. The powder of a layered lithium-nickel-manganese-cobalt composite oxide of claim 1, wherein the value of C/S is 0.015 or smaller.

* * * * *